H. J. SCHMICK.
ART OF MAKING CIRCUMFERENTIAL GROOVES.
APPLICATION FILED APR. 16, 1920.
1,434,410.
Patented Nov. 7, 1922.
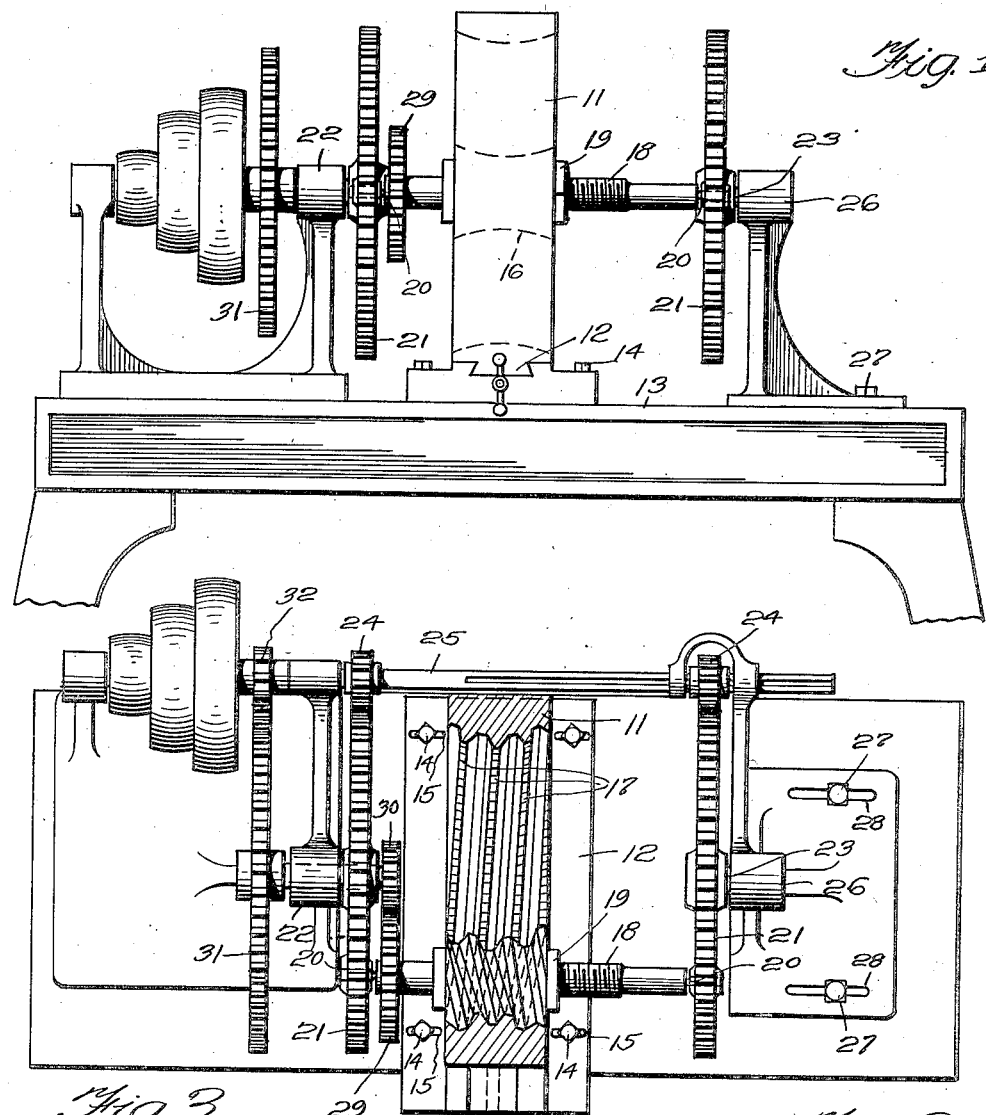
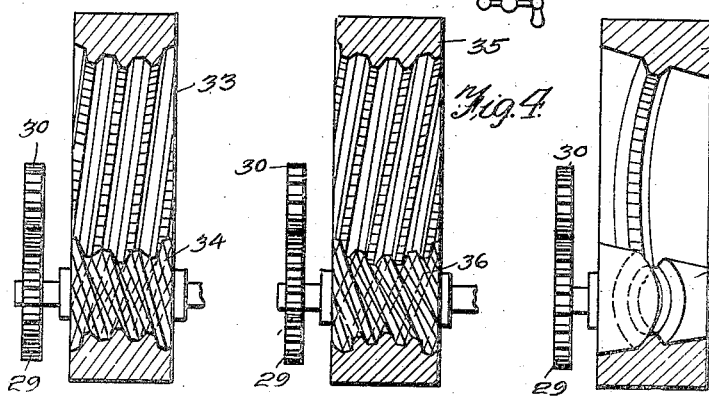
INVENTOR.
Henry J. Schmick
by
Emery Booth
his ATTORNEYS.

Patented Nov. 7, 1922.

1,434,410

UNITED STATES PATENT OFFICE.

HENRY J. SCHMICK, OF WILLIAMSPORT, PENNSYLVANIA, ASSIGNOR TO SCHMICK SCREW AND GEAR COMPANY, OF WILMINGTON, DELAWARE, A CORPORATION OF DELAWARE.

ART OF MAKING CIRCUMFERENTIAL GROOVES.

Application filed April 16, 1920. Serial No. 374,437.

*To all whom it may concern:*

Be it known that I, HENRY J. SCHMICK, a citizen of the United States, and a resident of Williamsport, in the county of Lycoming and State of Pennsylvania, have invented an Improvement in the Art of Making Circumferential Grooves, of which the following description, in connection with the accompanying drawings, is a specification, like characters on the drawings representing like parts.

This invention relates particularly to gears having teeth arranged circumferentially around the axis of rotation, such as are used in worm, screw and helical gearing; but the invention is not restricted to such gears, as it is applicable to all kinds of rotary members having peripheral grooves or teeth.

The invention comprises both methods and apparatus for carrying it out, and is not limited to any particular method or apparatus. What the invention consists in may be ascertained from the following description and appended claims.

In order that the invention may be fully understood, it is described as embodied in a preferred form of apparatus illustrated in the accompanying drawings, and in the methods which may be performed with the aid of such apparatus, but it will be evident that other methods and apparatus can be adapted to the purposes of the invention.

In the drawings, Fig. 1 is a side elevation of a machine for cutting worm or screw gearing according to the invention;

Fig. 2 is a part plan view and part horizontal section of the same on the line 2—2 in Fig. 1, looking down from above, showing a cut gear in the machine;

Fig. 3 is a horizontal section of the cutter and part of the driving gears for cutting a double thread worm;

Fig. 4 is a similar view showing the same parts for cutting a triple thread worm; and Fig. 5 is a similar view showing the same parts for cutting a non-cylindrical cam with a continuous groove.

Referring to Figs. 1 and 2, the apparatus therein shown consists of a cutter ring 11 mounted on a cross slide 12 which is secured to the bed 13 of the machine frame by bolts 14 or other suitable fastenings. Slots 15 are provided in the cross slide for the fastening bolts in order to permit of adjustment of the cross slide lengthwise of the bed.

The cutter ring has its inner periphery shaped to conform to the outer periphery of the work blank 16. The cutting teeth 17 are disposed in a continuous curved path winding around the inner periphery of the cutter ring, starting near one face of the ring and ending near the opposite face of the ring, forming a series of similar convolutions spaced from each other throughout the length of the curve. The spaces between the several convolutions conform to the spaces between successive turns of the groove which it is desired to cut in the work blank 16, and may be uniform or may vary according to the purpose for which it is to be used.

The work blank 16 has a hole through it concentric with its axis, and is secured upon an arbor 18, by means of a clamping nut 19 whereby it may be caused to rotate with the arbor. The arbor is rotatably mounted between centers 20 carried by face plates 21 journaled on the head stock spindle 22 and tail stock spindle 23, respectively. Each face plate has gear teeth formed around its periphery, and the two face plates are rotated at the same speed in the same direction by means of pinions 24 on the power shaft 25.

The tail stock pinion 24 is splined upon the power shaft 25 and the tail stock 26 is adjustable lengthwise on the bed of the machine, to which it is secured by means of bolts 27 passing through slots 28, whereby the arbor 18 may be removed from the machine to change work.

The rotation of the arbor 18 upon its centers is controlled by a gear 29 fixed upon the arbor and meshing with a mating gear 30 fixed upon the inner end of the head stock spindle 22. The outer end of the spindle 22 has a large gear 31 fixed upon it, which in turn meshes with a pinion 32 upon the power shaft. The velocity ratios between the gears which drive the face plates and the gears which control the rotation of the arbor upon its centers are such that for cutting a single groove around the work blank the arbor would be rotated once in the reverse direction for each rotation of the face plates. The effect of this arrangement is that the arbor is held in the same angular position relative to its own axis during its complete revolution around the inside periphery of the cutter ring.

For cutting a double groove, the cutter 33 has two series of cutting teeth; and the driving gears 32 and 31 upon the power shaft and spindle respectively are replaced by gears having a velocity ratio such that the arbor carrying the work blank 34 is caused to rotate once around its own axis in the opposite direction to that of the face plates for each revolution around the cutter ring (see Fig. 3).

For cutting three grooves the cutter 35 has three series of cutting teeth, and the velocity ratio between the driving gears should be such that the arbor carrying the work blank 36 will be rotated twice around its own axis in the opposite direction to that of the face plates for each revolution around the cutter ring (see Fig. 4).

For cutting special shaped grooves, such as shown in Fig. 5, the cutter 37 has its inner periphery shaped to conform to the shape of the work 38 (see Fig. 5), with a series of cutting teeth arranged in a path to suit the conformation of groove desired, and may be either continuous or not as desired.

To form a groove, the blank 19 is clamped upon the arbor 18 and the latter is mounted between the centers 20. The cross slide is withdrawn to permit the blank to rotate inside of the cutter ring, and as the machine is started the cross slide is fed in to carry the cutting teeth into the work. The teeth should be fed in for their full depth in the first quarter revolution of the face plates and arbor. One and one-quarter revolutions of the face plates and arbor are sufficient to finish the groove all the way around the work blank, but more revolutions will make a smoother finish upon the sides and bottom of the groove.

The same procedure is followed for making two grooves and three grooves, only the cutter ring and spindle driving gears being changed as heretofore described.

It is evident that grooved products can be produced by the invention which are of various forms, some of which closely resemble in general appearance the ordinary form of helical or screw gears or worms; but that the invention permits of other products being produced, such as, for example, solids of revolution having circumferential grooves of varying angularity with respect to their axis and of varying cross-sectional shape, which cannot be produced by ordinary screw and gear cutting or generating methods and apparatus.

I claim the following as my invention:

1. The art of making circumferential grooves by rotating a suitable blank upon its axis and revolving it to engage with a series of cutting teeth arranged around said blank in a spiral convolution having its axis eccentric to the axis of said blank, whereby said teeth cut a circumferential groove around said blank, while maintaining a fixed relative rotative movement between said blank and convolution whereby said circumferential groove is of constantly changing position lengthwise of the axis of the blank.

2. The art of making gears and the like by rotating a blank upon its axis and revolving it in a circular orbit about a fixed axis to engage with a series of cutting teeth arranged about said fixed axis in a convolution having such radius as to intercept the periphery of said blank at each point in its orbit positioning successive teeth to engage said blank at laterally spaced points and maintaining a fixed relative rotation between said blank and cutting teeth as the blank revolves in its orbit, whereby successive teeth cut circumferential portions of the periphery of said blank to form a groove.

3. The art of making gears and the like by rotating a blank upon its axis and revolving it in a circular orbit about a fixed axis to engage with a series of cutting teeth arranged about said fixed axis in a convolution having its ends laterally displaced and having such radius as to intercept the periphery of said blank at each point in its orbit, and maintaining a fixed relative speed of rotation of said blank with reference to its speed of revolution proportional to the number of teeth to be formed in said blank.

4. The art of making gears and the like by rotating a blank upon its axis and revolving it in a circular orbit about a fixed axis to engage with rows of cutting teeth arranged about said fixed axis, each row having its ends laterally displaced and having such radius as to intercept the periphery of said blank at each point in its orbit, and maintaining a fixed relative rotation between said blank and cutting teeth in proportion to the number of rows of teeth as the blank revolves in its orbit, whereby successive portions of the periphery of said blank will be cut circumferentially by successive teeth in said rows and the lateral displacement of the ends thereof will determine the axial displacement of the ends of the grooves thereby formed upon the blank.

5. Forming circumferentially grooved elements by rotating a suitable blank upon its axis and moving it in a circular orbit relative to and in proximity with a series of cutting teeth lying in a curved line surrounding and concentric with said orbit, and arranging that successive teeth engage said blank at points in its periphery axially displaced with reference to each other, while maintaining synchronism between the speed of rotation of said blank and its relative orbital movement with respect to said series of teeth, whereby the successive teeth produce circumferential cuts that merge into a groove encircling said blank and conforming generally to the shape of the line followed by said teeth.

6. Apparatus for forming circumferentially grooved elements consisting of means for rotating a work arbor upon its axis and for simultaneously revolving it about a fixed center, a ring of cutting teeth arranged around said work arbor and concentric with said fixed center, successive cutting teeth being slightly displaced in an axial direction with reference to adjacent teeth, and means for maintaining a predetermined ratio between the speed of rotation of said arbor upon its axis and the speed of its motion of revolution about said fixed center, whereby said teeth cut a groove around the work on said arbor that said teeth follow during successive revolutions.

7. Apparatus for forming circumferentially grooved elements consisting of means for rotating a work arbor upon its axis and for simultaneously revolving it about a fixed center, a ring of cutting teeth arranged around said work arbor and concentric with said fixed center, successive cutting teeth being slightly displaced in an axial direction with reference to the adjacent teeth uniformly throughout said ring, and means for maintaining a predetermined velocity ratio between the rotation of said arbor upon its axis and its motion of revolution about said fixed center, whereby said teeth cut a groove around the work on said arbor of uniform axial advancement for equal angles of rotation about its axis.

8. Apparatus for forming circumferential grooves including a head stock, a tail stock, a pair of face plates mounted for rotation in said head and tail stocks, respectively, means for rotating said face plates in synchronism in the same direction, opposing centers in said face plates eccentrically placed with reference to their axis of rotation, a work arbor mounted on said centers, a gear on said work arbor, a spindle in said head stock, a gear on said spindle, and change speed gearing for rotating said spindle in synchronism with said face plates, said change speed gearing being adjustable whereby said arbor may be held stationary or rotated at the same speed or at a different speed and in synchronism with said face plates, and a ring of cutting teeth concentric with the axis of said face plates and adjustable to engage and cut the periphery of work on said arbor.

9. Apparatus for forming circumferential grooves including a head stock, a tail stock, a pair of face plates mounted for rotation in said head and tail stocks, respectively, means for rotating said face plates in synchronism in the same direction, aligning centers in said face plates eccentrically placed with reference to their axis of rotation, a work arbor mounted on said centers, a gear on said work arbor, a spindle in said head stock, a gear on said spindle in mesh with the gear on said arbor, and change speed gearing for rotating said spindle in synchronism with said face plates, whereby the speed of rotation of said arbor may be controlled and maintained in synchronism with said face plates, and a ring of cutting teeth concentric with the axis of said face plates, said ring being movable to bring said teeth into cutting engagement with work on said arbor.

In testimony whereof, I have signed my name to this specification.

HENRY J. SCHMICK.